United States Patent
Marks et al.

(10) Patent No.: US 11,245,576 B2
(45) Date of Patent: Feb. 8, 2022

(54) BLOCKCHAIN-BASED CONFIGURATION PROFILE PROVISIONING SYSTEM

(71) Applicant: Dell Products L.P., Round Rock, TX (US)

(72) Inventors: Kevin Thomas Marks, Georgetown, TX (US); Viswanath Ponnuru, Karnataka (IN)

(73) Assignee: Dell Products L.P., Round Rock, TX (US)

( * ) Notice: Subject to any disclaimer, the term of this patent is extended or adjusted under 35 U.S.C. 154(b) by 28 days.

(21) Appl. No.: 16/125,415

(22) Filed: Sep. 7, 2018

(65) Prior Publication Data

US 2020/0084097 A1     Mar. 12, 2020

(51) Int. Cl.
| | |
|---|---|
| *H04L 12/24* | (2006.01) |
| *H04L 29/08* | (2006.01) |
| *H04L 29/12* | (2006.01) |
| *H04L 12/18* | (2006.01) |
| *G06Q 20/06* | (2012.01) |
| *G06Q 20/38* | (2012.01) |
| *G06Q 20/02* | (2012.01) |

(Continued)

(52) U.S. Cl.
CPC ........ *H04L 41/0806* (2013.01); *H04L 12/185* (2013.01); *H04L 41/0213* (2013.01); *H04L 41/5045* (2013.01); *H04L 61/2015* (2013.01); *H04L 67/303* (2013.01); *G06Q 20/065* (2013.01); *G06Q 20/389* (2013.01); *G06Q 2220/00* (2013.01)

(58) Field of Classification Search
CPC ............. H04L 41/0806; H04L 61/2015; H04L 67/303; H04L 41/0213; H04L 41/5045; H04L 12/185; H04L 12/1895; G06Q 2220/00; G06Q 20/065; G06Q 20/389; G06Q 20/02; G06Q 20/341; G06Q 20/38215; G06Q 20/3678
See application file for complete search history.

(56) References Cited

U.S. PATENT DOCUMENTS 6,823,454 B1    11/2004  Hind et al.
7,739,359 B1 *   6/2010  Millet ................. H04L 12/2861
                                                                 709/220

(Continued)

FOREIGN PATENT DOCUMENTS

WO    WO-2019158213 A1 *  8/2019  .............. H04W 8/18

*Primary Examiner* — Ario Etienne
*Assistant Examiner* — Kamal Hossain
(74) *Attorney, Agent, or Firm* — Joseph Mencher

(57) ABSTRACT

A blockchain-based configuration profile provisioning system includes a client device that generates and broadcasts a blockchain transaction that identifies the client device and is directed to a blockchain address that is included in a blockchain. A blockchain device receives the blockchain transaction broadcast by the client device, executes a smart contract associated with the blockchain address, and determines that the execution of the smart contract has provided an indication that the client device identified in the blockchain transaction is authorized to receive a configuration profile. In response, the blockchain device causes a configuration profile token to be generated and transmitted. A configuration profile system receives the configuration profile token and, in response, retrieves and transmits the configuration profile to the client device.

16 Claims, 10 Drawing Sheets

(51) Int. Cl.
     *G06Q 20/34*     (2012.01)
     *G06Q 20/36*     (2012.01)

(56)            References Cited

U.S. PATENT DOCUMENTS

| | | | |
|---|---|---|---|
| 2016/0261690 A1* | 9/2016 | Ford | H04L 9/3239 |
| 2017/0134161 A1* | 5/2017 | Goeringer | H04L 63/0428 |
| 2017/0302663 A1* | 10/2017 | Nainar | H04L 63/123 |
| 2018/0183802 A1* | 6/2018 | Choyi | H04L 63/105 |
| 2018/0191714 A1* | 7/2018 | Jentzsch | H04L 9/3247 |
| 2018/0248880 A1* | 8/2018 | Sardesai | H04L 63/101 |
| 2019/0190719 A1* | 6/2019 | van de Ruit | H04L 9/3236 |
| 2019/0199535 A1* | 6/2019 | Falk | H04L 9/0861 |
| 2019/0319861 A1* | 10/2019 | Pan | G06Q 20/405 |
| 2019/0333059 A1* | 10/2019 | Fallah | H04L 9/3239 |
| 2019/0334859 A1* | 10/2019 | Kannan | |
| 2019/0342290 A1* | 11/2019 | Mittal | H04L 63/083 |
| 2019/0349254 A1* | 11/2019 | Nolan | |
| 2020/0007322 A1* | 1/2020 | Weldemariam | G06F 16/27 |
| 2020/0027066 A1* | 1/2020 | Ramasamy | H04L 67/104 |
| 2020/0067696 A1* | 2/2020 | Sarin | H04L 9/3239 |

* cited by examiner

BLOCKCHAIN-BASED CONFIGURATION PROFILE PROVISIONING SYSTEM

BACKGROUND

The present disclosure relates generally to information handling systems, and more particularly to using a blockchain to provide configuration profiles to information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, any of a variety of client devices known in the art, are often configured via a network. For example, the Dynamic Host Configuration Profile (DHCP) provides a network management protocol utilized with User Datagram Protocol/Internet Protocol (UDP/IP) networks, with DHCP servers dynamically providing configuration profiles (e.g., assigning IP addresses and other network configuration parameters) to each client device in a network so that those client devices can communicate with other IP networks. As such, the DHCP servers enable client devices to request IP addresses and networking parameters automatically from an Internet Service Provider (ISP), thus reducing the need for a network administrator or other user to manually assign those IP addresses to all of the network devices.

The DHCP includes DHCP vendor specific options that enable the DHCP server to provide vendor specific information such as, for example, a variety of configuration details, to the client devices. For example, each vendor utilizing DHCP vendor specific options may be identified by a vendor string, and a client device may request DHCP vendor specific options from a DHCP server via a DHCP request that utilizes DHCP option 43, and includes the vendor string along with a list of DHCP vendor specific options. The DHCP server may then reply to the client device utilizing DHCP option 43 and including the vendor specific information. However, the provisioning of configuration profiles using the methods discussed above (and similar methods that would be apparent to one of skill in the art) raises a number of issues.

For example, in "hybrid cloud" scenarios, third party, off-premises configuration profile providers manage the DHCP services and offerings, and the on-premises network administrators have very limited capabilities with regard to the DHCP services and offerings, with any changes to the DHCP server configuration associated with added costs and time delays. Furthermore, a primary benefit of the DHCP is the ability of client devices to join a network with no prior knowledge about the network, but that benefit carries with it the danger that those client devices cannot distinguish between response from authorized DHCP servers, and responses from malicious devices impersonating an authorized DHCP server. Further still, DHCP options do not include any standard authentication and authorization scheme for providing vendor specific information, which carries with it the risk that such vendor specific information may be exposed to unauthorized client devices and users in the network. Finally, additional overhead and maintenance is required for DHCP systems to support DHCP vendor specific options according to different versions of the DHCP (e.g., DHCPv4 and DHCPv6.)

Accordingly, it would be desirable to provide an improved configuration profile provisioning system.

SUMMARY

According to one embodiment, an Information Handling System (IHS) network includes a blockchain device that is coupled to a network and that includes: a blockchain device processing system; and a blockchain device memory system that is coupled to the blockchain device processing system and that includes instructions that, when executed by the blockchain device processing system, cause the blockchain device to: receive a blockchain transaction that was broadcast by a client device that is identified in the blockchain transaction and that is coupled to the network; execute a smart contract that is associated with a blockchain address that is included in a blockchain and that is identified in the blockchain transaction; and determine that the execution of the smart contract has provided an indication that the client device identified in the blockchain transaction is authorized to receive a configuration profile and, in response, cause the generation and transmittal of a configuration profile token that is configured to cause a configuration profile to be provided to the client device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
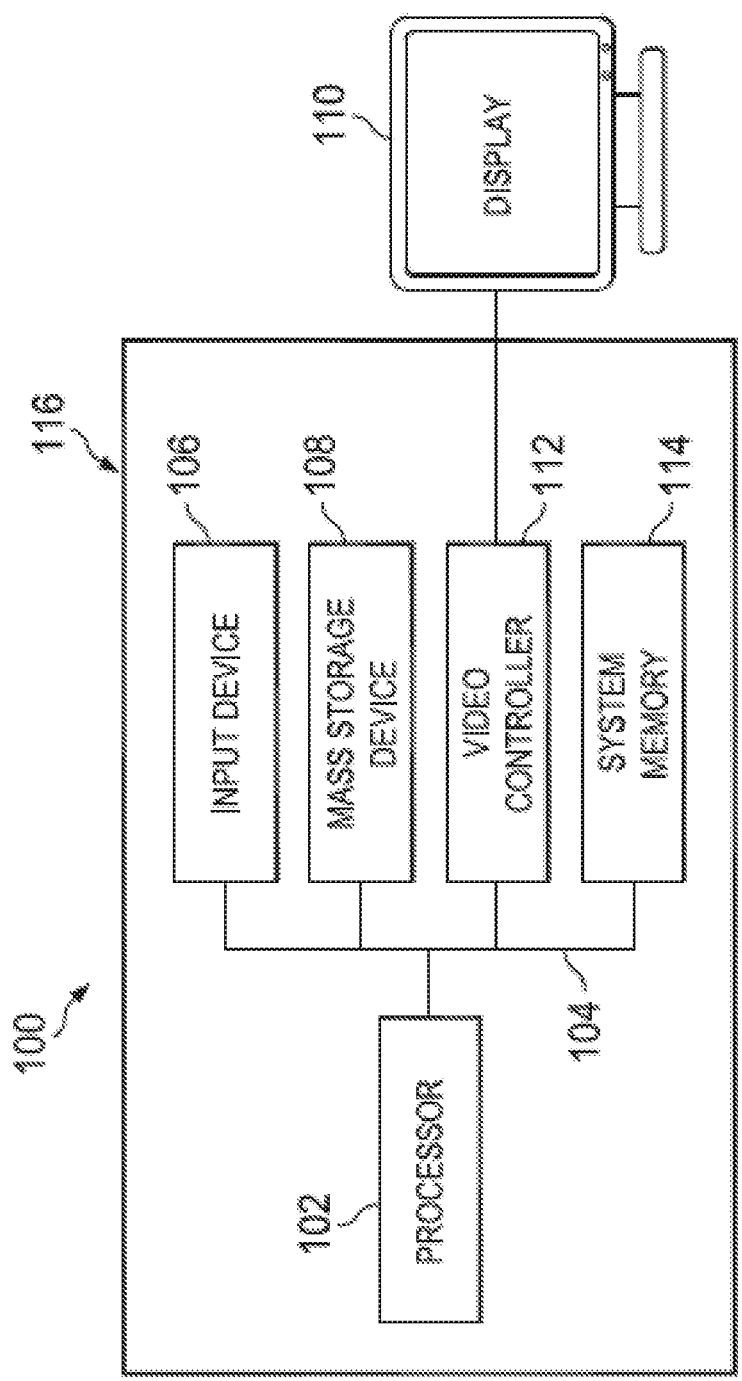
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
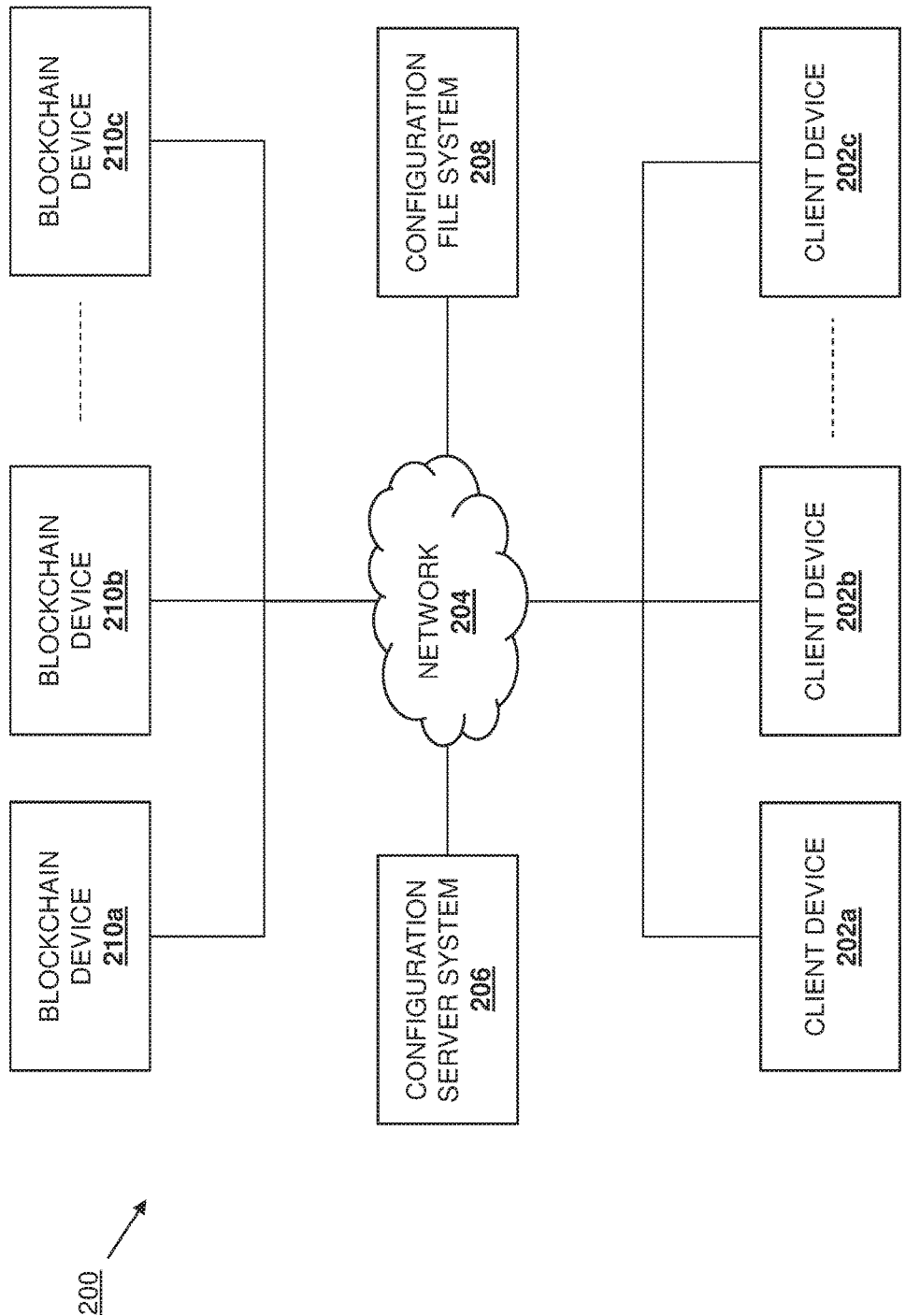
FIG. 2 is a schematic view illustrating an embodiment of a blockchain-based configuration profile provisioning system.

Referring now to FIG. 2, an embodiment of a blockchain-based configuration profile provisioning system 200 is illustrated. In the embodiments discussed below, the blockchain-based configuration profile provisioning system 200 is controlled by a single entity such as, for example, an operator, owner, and/or controller of a Local Area Network (LAN) that operates, owns, and/or controls each of the devices, systems, and network that provide the functionality of the blockchain-based configuration profile provisioning system 200. For example, many businesses provide one or more physical locations at which plurality of client devices are connected via a network (e.g., in an office space or office spaces), and such business may utilize the teachings of the present disclosure to provide configuration profiles for those client devices in the manner described below. However, one of skill in the art in possession of the present disclosure will recognize that separate control (or cooperate control by a plurality of entities) of one or more of the devices, systems, and network that provide the functionality of the blockchain-based configuration profile provisioning system 200 will fall within the scope of the present disclosure as well.

In the illustrated embodiment, the blockchain-based configuration profile provisioning system 200 includes a plurality of client devices 202*a*, 202*b*, and up to 202*c*. In an embodiment, any or all of the client devices 202*a-c* may be provided by the IHS 100 discussed above with reference to FIG. 1, and/or may include some or all of the components of the IHS 100. In specific examples, the client devices 202*a-c* may include server devices, storage devices, networking devices, desktop computing devices, laptop/notebook computing devices, tablet computing devices, and/or any other client device that would be apparent to one of skill in the art in possession of the present disclosure. Each of the client devices 202*a-c* is coupled to a network 204 which, as discussed above, is provided by a LAN in the examples below. However, other types of networks (e.g., the Internet) may be utilized in the blockchain-based configuration profile provisioning system 200 while remaining within the scope of the present disclosure as well.

In the illustrated embodiment, a configuration server system 206 is also coupled to the network 204. In an embodiment, the configuration server system 206 may be provided by the IHS 100 discussed above with reference to FIG. 1, and/or may include some or all of the components of the IHS 100. In specific examples, the configuration server system 206 may include one or more Dynamic Host Configuration Protocol (DHCP) server devices and/or other configuration computing devices that would be apparent to one of skill in the art in possession of the present disclosure. However, in some embodiments discussed below, the configuration server system 206 may be omitted. In the illustrated embodiment, a configuration file system 208 is also coupled to the network 204. In an embodiment, the configuration file system 208 may be provided by the IHS 100 discussed above with reference to FIG. 1, and/or may include some or all of the components of the IHS 100. In specific examples, the configuration file system 208 may include one or more InterPlanetary File System (IPFS)-enabled devices and/or other configuration file provisioning computing devices that would be apparent to one of skill in the art in possession of the present disclosure. In the illustrated embodiment, a plurality of blockchain devices 210*a*, 210*b*, and up to 210*c* are also coupled to the network 204. In an embodiment, any or all of the blockchain devices 210*a-c* may be provided by the IHS 100 discussed above with reference to FIG. 1, and/or may include some or all of the components of the IHS 100. In specific examples, the blockchain devices 210*a-c* may include one or more server devices and/or other blockchain maintaining computing devices that would be apparent to one of skill in the art in possession of the present disclosure. While a specific blockchain-based configuration profile provisioning system 200 has been illustrated and described, one of skill in the art in possession of the present disclosure will recognize that the functionality of the blockchain-based configuration profile provisioning system of the present disclosure may be enabled by a variety of devices and/or systems in a variety of configurations that will fall within the scope of the present disclosure as well.

Figure 3:
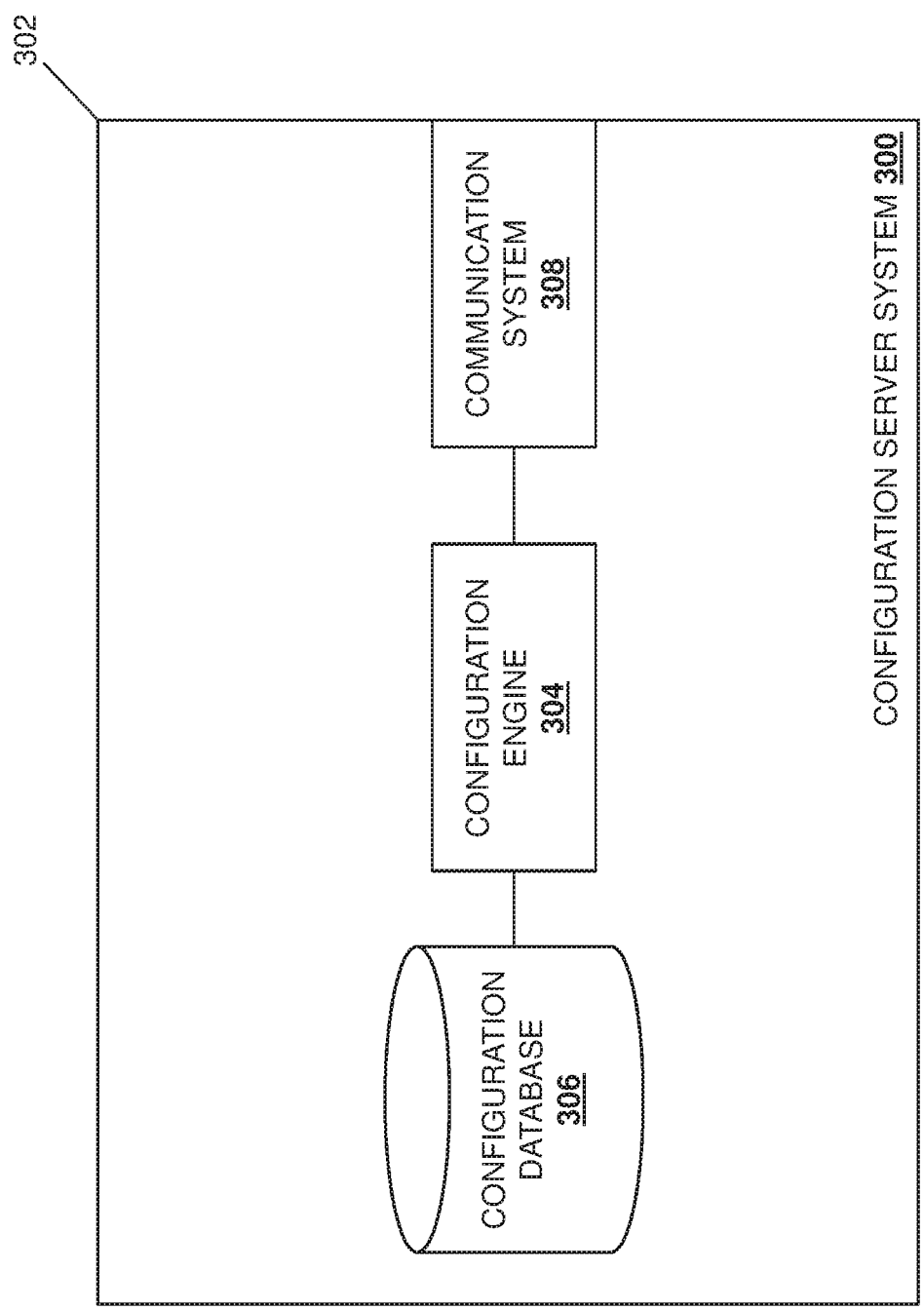
FIG. 3 is a schematic view illustrating an embodiment of a configuration server system used in the blockchain-based configuration profile provisioning system of FIG. 2.

Referring now to FIG. 3, an embodiment of a configuration server system 300 is illustrated that may provide the configuration server system 206 discussed above with reference to FIG. 2. As such, the configuration server system 300 may be the IHS 100 discussed above with reference to FIG. 1 and/or may include some or all of the components of the IHS 100, and in specific examples may include one or more Dynamic Host Configuration Protocol (DHCP) server devices and/or other configuration computing devices that would be apparent to one of skill in the art in possession of the present disclosure. In the illustrated embodiment, the configuration server system 300 includes a chassis 302 that houses the components of the configuration server system 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system, and that includes instructions that, when executed by the processing system, cause the processing system to provide a configuration engine 304 that is configured to perform the functionality of the configuration engines and configuration server systems discussed below.

The chassis 302 may also house a storage system (not illustrated, but which may include the storage device 108 discussed above with reference to FIG. 1) that is coupled to the configuration engine 304 (e.g., via a coupling between the storage system and the processing system) and that includes a configuration database 306 that is configured to store any of the data and/or other information utilized by the configuration engine 304 as described below. The chassis 302 may also house a communication system 308 that is coupled to the configuration engine 304 (e.g., via a coupling between the communication system 308 and the processing system) and may includes a Network Interface Controller (NIC), a wireless communication subsystem (e.g., a BLUETOOTH® wireless communication system, a WiFi wireless communication system, etc.), and/or other communication components that allow for the communications via a network (e.g., the network 204 of FIG. 2) discussed below. However, while a specific configuration server system 300 has been illustrated and described, one of skill in the art in possession of the present disclosure will recognize that configuration server systems (e.g., DHCP servers) may include a variety of components and component configurations that would enable the functionality discussed below while remaining within the scope of the present disclosure.

Figure 4:
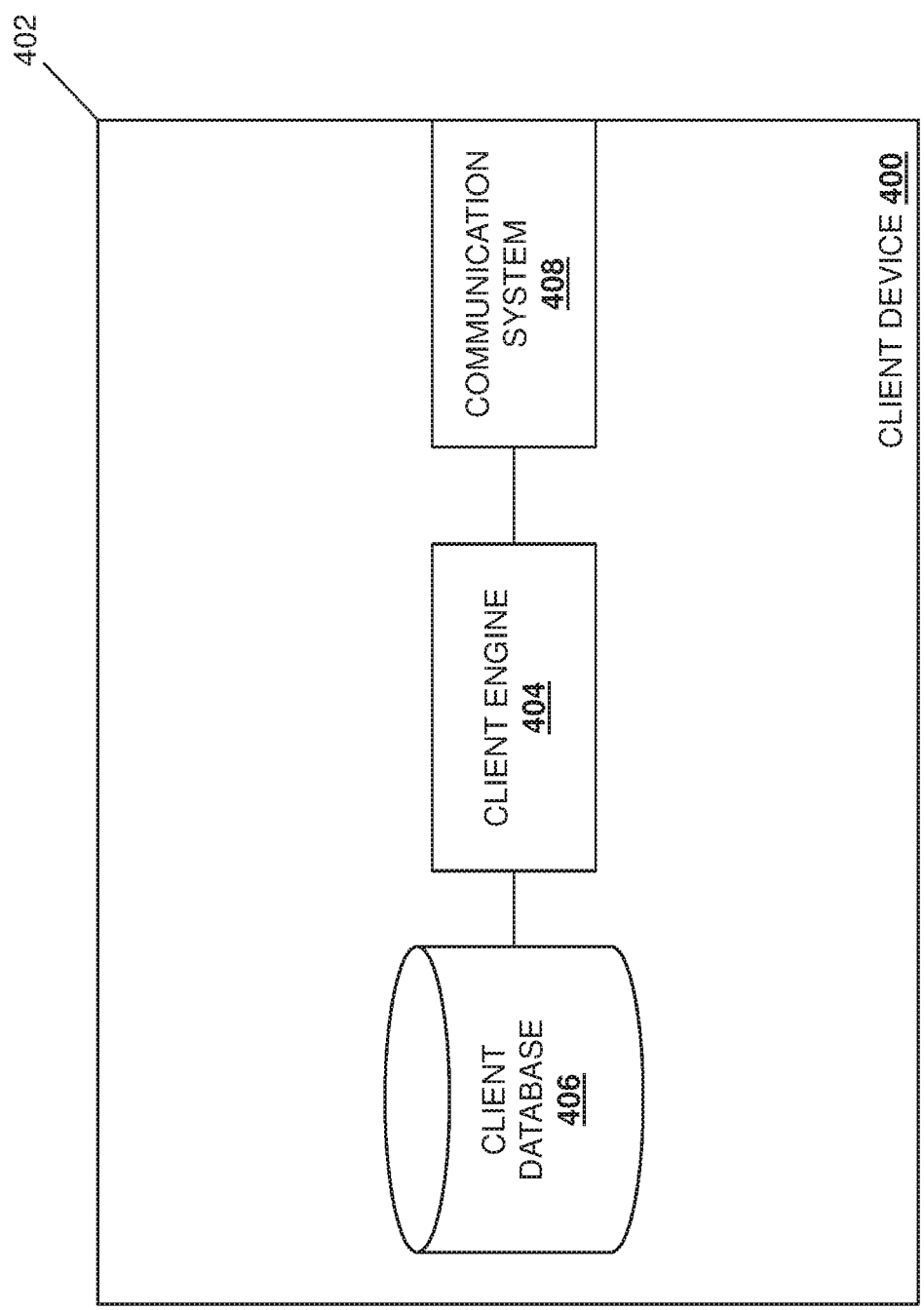
FIG. 4 is a schematic view illustrating an embodiment of a client device used in the blockchain-based configuration profile provisioning system of FIG. 2.

Referring now to FIG. 4, an embodiment of a client device 400 is illustrated that may provide any or all of the client devices 202*a*-*c* discussed above with reference to FIG. 2. As such, the client device 400 may be the IHS 100 discussed above with reference to FIG. 1 and/or may include some or all of the components of the IHS 100, and in specific examples may be provided by server devices, storage devices, networking devices, desktop computing devices, laptop/notebook computing devices, tablet computing devices, and/or any other client device that would be apparent to one of skill in the art in possession of the present disclosure. In the illustrated embodiment, the client device 400 includes a chassis 402 that houses the components of the client device 400, only some of which are illustrated in FIG. 4. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system, and that includes instructions that, when executed by the processing system, cause the processing system to provide a client engine 404 that is configured to perform the functionality of the client engines and client devices discussed below.

The chassis 402 may also house a storage system (not illustrated, but which may include the storage device 108 discussed above with reference to FIG. 1) that is coupled to the client engine 404 (e.g., via a coupling between the storage system and the processing system) and that includes a client database 406 that is configured to store any of the data and/or other information utilized by the client engine 404 as described below. The chassis 402 may also house a communication system 408 that is coupled to the client engine 404 (e.g., via a coupling between the communication system 408 and the processing system) and may includes a Network Interface Controller (NIC), a wireless communication subsystem (e.g., a BLUETOOTH® wireless communication system, a WiFi wireless communication system, etc.), and/or other communication components that allow for the communications via a network (e.g., the network 204 of FIG. 2) discussed below. However, while a specific client device 400 has been illustrated and described, one of skill in the art in possession of the present disclosure will recognize that client devices may include a variety of components and component configurations that would enable the functionality discussed below while remaining within the scope of the present disclosure.

Figure 5:
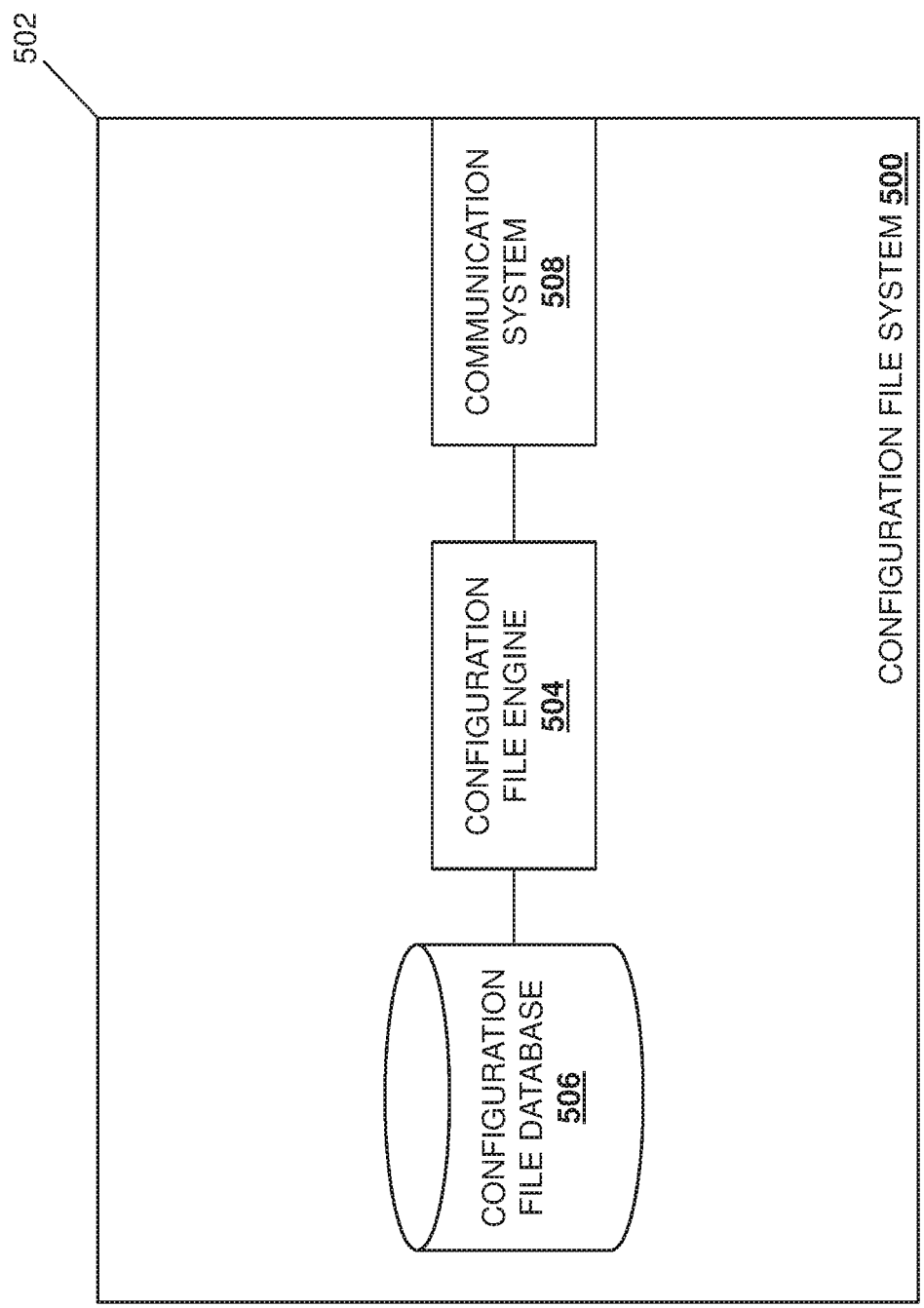
FIG. 5 is a schematic view illustrating an embodiment of a configuration file system used in the blockchain-based configuration profile provisioning system of FIG. 2.

Referring now to FIG. 5, an embodiment of a configuration file system 500 is illustrated that may provide the configuration file system 208 discussed above with reference to FIG. 2. As such, the configuration file system 500 may be the IHS 100 discussed above with reference to FIG. 1 and/or may include some or all of the components of the IHS 100, and in specific examples may be provided by one or more InterPlanetary File System (IPFS)-enabled devices and/or other configuration file provisioning computing devices that would be apparent to one of skill in the art in possession of the present disclosure. In the illustrated embodiment, the configuration file system 500 includes a chassis 502 that houses the components of the configuration file system 500, only some of which are illustrated in FIG. 5. For example, the chassis 502 may house a processing system (not illustrated, but which may include the processor 102 discussed above with reference to FIG. 1) and a memory system (not illustrated, but which may include the memory 114 discussed above with reference to FIG. 1) that is coupled to the processing system, and that includes instructions that, when executed by the processing system, cause the processing system to provide a configuration file engine 504 that is configured to perform the functionality of the configuration file engines and configuration file systems discussed below.

The chassis 502 may also house a storage system (not illustrated, but which may include the storage device 108 discussed above with reference to FIG. 1) that is coupled to the configuration file engine 504 (e.g., via a coupling between the storage system and the processing system) and that includes a configuration file database 506 that is configured to store any of the data and/or other information utilized by the configuration file engine 504 as described below. The chassis 502 may also house a communication system 508 that is coupled to the configuration file engine 504 (e.g., via a coupling between the communication system 508 and the processing system) and may includes a Network Interface Controller (NIC), a wireless communication subsystem (e.g., a BLUETOOTH® wireless communication system, a WiFi wireless communication system, etc.), and/or other communication components that allow for the communications via a network (e.g., the network 204 of FIG. 2) discussed below. However, while a specific configuration file system 500 has been illustrated and described, one of skill in the art in possession of the present disclosure will recognize that configuration file systems may include a variety of components and component configurations that would enable the functionality discussed below while remaining within the scope of the present disclosure.

Figure 6:
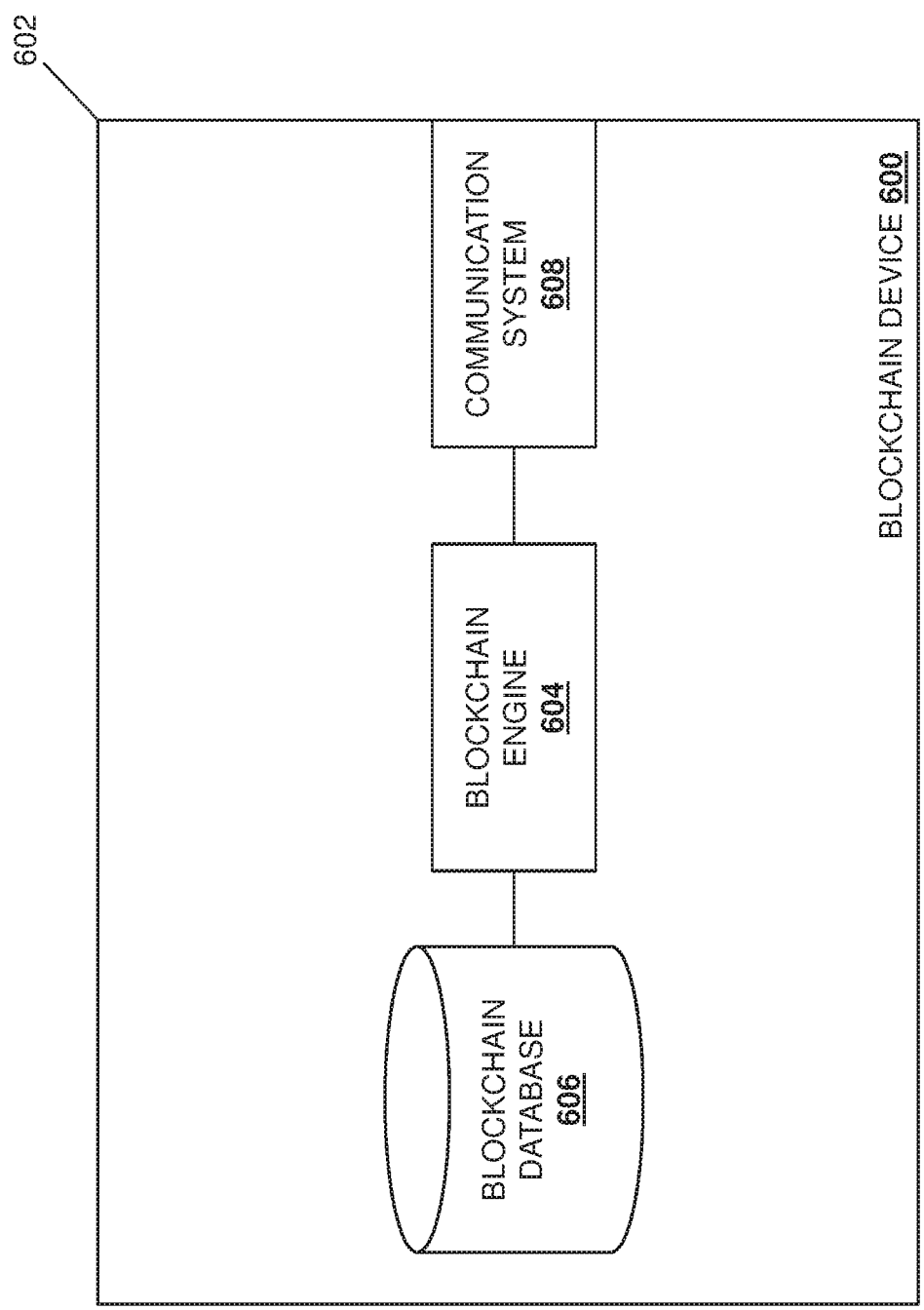
FIG. 6 is a schematic view illustrating an embodiment of a blockchain device used in the blockchain-based configuration profile provisioning system of FIG. 2.

Referring now to FIG. 6, an embodiment of a blockchain device 600 is illustrated that may provide any or all of the blockchain devices 210a-c discussed above with reference to FIG. 6. As such, the blockchain device 600 may be the IHS 100 discussed above with reference to FIG. 1 and/or may include some or all of the components of the IHS 100, and in specific examples may be provided by server devices and/or other blockchain maintaining computing devices that would be apparent to one of skill in the art in possession of the present disclosure. In the illustrated embodiment, the blockchain device 600 includes a chassis 602 that houses the components of the blockchain device 600, only some of which are illustrated in FIG. 6. For example, the chassis 602 may house a processing system (not illustrated, but which may include the processor 102 discussed above with reference to FIG. 1) and a memory system (not illustrated, but which may include the memory 114 discussed above with reference to FIG. 1) that is coupled to the processing system, and that includes instructions that, when executed by the processing system, cause the processing system to provide a blockchain engine 604 that is configured to perform the functionality of the client engines and client devices discussed below.

The chassis 602 may also house a storage system (not illustrated, but which may include the storage device 108 discussed above with reference to FIG. 1) that is coupled to the blockchain engine 604 (e.g., via a coupling between the storage system and the processing system) and that includes a blockchain database 606 that is configured to store any of the data and/or other information utilized by the blockchain engine 604 as described below. The chassis 602 may also house a communication system 608 that is coupled to the blockchain engine 604 (e.g., via a coupling between the communication system 408 and the processing system) and may includes a Network Interface Controller (NIC), a wireless communication subsystem (e.g., a BLUETOOTH® wireless communication system, a WiFi wireless communication system, etc.), and/or other communication components that allow for the communications via a network (e.g., the network 204 of FIG. 2) discussed below. However, while a specific blockchain device 600 has been illustrated and described, one of skill in the art in possession of the present disclosure will recognize that blockchain devices may include a variety of components and component configurations that would enable the functionality discussed below while remaining within the scope of the present disclosure.

Figure 7:
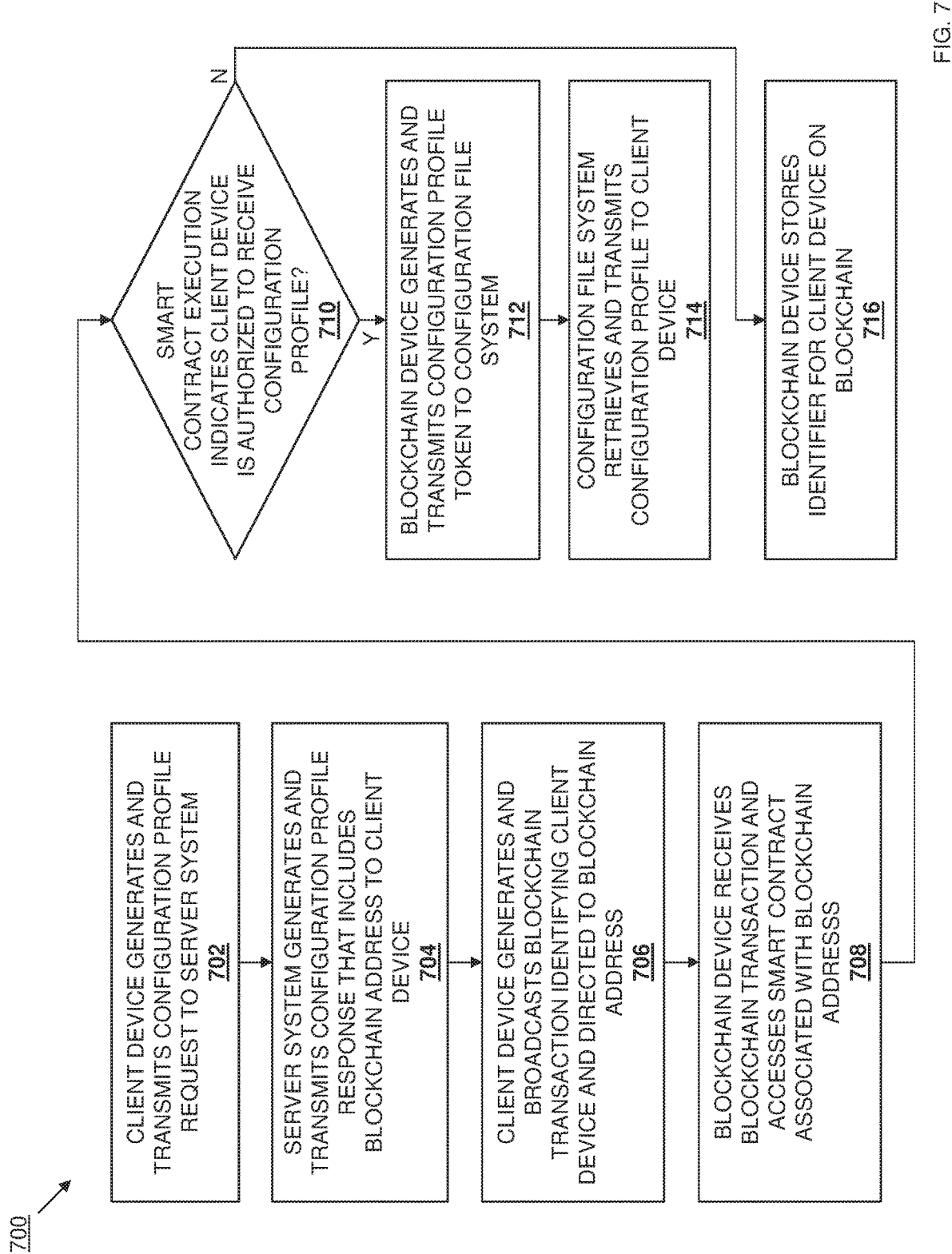
FIG. 7 is a flow chart illustrating an embodiment of a method for providing configuration profiles via a blockchain.

Referring now to FIG. 7, an embodiment of a method 700 for blockchain-based configuration profile provisioning is illustrated. As discussed below, the systems and methods of the present disclosure provide a decentralized access control policy framework for securely disseminating configuration profiles via blockchain-based smart contracts that define configuration profile access rights for client devices in a network, while providing extensibility according to a local network infrastructure setup and needs, enabling a cost effective and flexible configuration profile provisioning solution. Client devices in the network may send configuration profile requests (e.g., DHCP requests) to a configuration server system, which may respond with a configuration profile response (e.g., a DHCP response) that includes a blockchain address included in a blockchain stored therein. A client device receiving a configuration profile response may then generate a blockchain transaction directed to the blockchain address and including an identifier for the client, and broadcast that blockchain transaction to a blockchain network of blockchain devices. The blockchain devices receiving that broadcast blockchain transaction will operate to validate that transaction and access a smart contract included in the blockchain, and then execute that smart contract to determine whether the client device that broadcast that blockchain transaction is authorized to receive a configuration profile. If the execution of the smart contract indicates that the client device may receive the configuration profile, the blockchain device may cause a configuration profile token to be released to a configuration file system, which will in turn provide a configuration profile to the client device that broadcast the blockchain transaction. If the execution of the smart contract indicates that the client device may not receive the configuration profile, the identifier for that client device may be stored on the blockchain, and future configuration profile requests from that client device may be ignored.

In an embodiment, prior to the method 700, an administrator of the blockchain-based configuration profile provisioning system 200 may provide configuration profiles in the configuration file system 208/500 by, for example, storing those configuration files in the configuration file database 506. For example, the configuration files stored in the configuration file system 208/500 may be created as per Original Equipment Manufacturer (OEM) vendor specifications, and the administrator of the blockchain-based configuration profile provisioning system 200 may customize any configuration files stored in the configuration file system 208/500 as desired. Furthermore, configuration profile secure access rules may be generated that define which client devices in the blockchain-based configuration profile provisioning system 200 are authorized to access and/or utilize any of the configuration profiles stored in the configuration file system 208/500, and those configuration profile secure access rules may be stored in the configuration file system 208/500 or other storage system (not illustrated) connected to the network 204. In a specific example, configuration profile secure access rules may associate client device-specific identifiers (e.g., "service tags", serial numbers, and/or other globally unique device identifiers that would be apparent to one of skill in the art in possession of the present disclosure) with any subset of the configuration files stored in the configuration file system 208/500, which may enable or prevent configuration files from being provided to any client device in the blockchain-based configuration profile provisioning system 200, as discussed below.

Furthermore, other configuration profile secure access rules may include information that allows for validation and authorization of accounts of users of the client devices, date/time policies that indicate dates and/or times at which configuration profiles may be accessed, and/or other security information that would be apparent to one of skill in the art in possession of the present disclosure. However, while specific configuration profile secure access rules have been described, one of skill in the art in possession of the present disclosure will recognize that secure access may be provided to the configuration profiles according to the teachings of the present disclosure in a variety of manners that will fall within its scope as well.

Furthermore, prior to the method 700, an administrator of the blockchain-based configuration profile provisioning system 200 may provide a smart contract on a blockchain that is maintained by the blockchain devices 210*a-c* in the blockchain-based configuration profile provisioning system 200. As would be understood by one of skill in the art in possession of the present disclosure, the blockchain devices 210*a-c* may operate to maintain a blockchain utilized in the blockchain-based configuration profile provisioning system 200 by receiving blockchain transactions broadcast by client devices in the blockchain-based configuration profile provisioning system 200, validating those blockchain transactions in "blocks" that include a plurality of blockchain transactions, and then appending those blocks to the blockchain (i.e., to blocks that were previously appended to the blockchain.) Furthermore, one of skill in the art in possession of the present disclosure will recognize that the appending of blocks to the blockchain may be accomplished via proof-of-methods, proof-of-stake methods, and/or other block verification and appending methods known in the art. As such, the smart contract utilized in the blockchain-based configuration profile provisioning system 200 may be provided on the blockchain in a blockchain transaction that is broadcast by an administrator device (not illustrated) that is coupled to the network 204, with that blockchain transaction directed to a blockchain address included on that blockchain. In a specific example, code that provides the smart contract utilized in the blockchain-based configuration profile provisioning system 200 may include the following:

```
Function getDeviceConfigProfile {
Input: requestorID, targetDeviceID
    if (!requester.account.isValid( ))
        console.log("Invalid Account");
        return error_status
    if (!requester.account.isAuthorized( ))
        console.log("Invalid Account and Authorization");
        return error_status
    assetValidity = verifyITAsset (targetDeviceID);
    if(!assetValidity)
        console.log("Request Denied: Unauthorized IT Asset"):
        return error_status;
    configProfileID = getConfigurationFile(targetDeviceID);
    grantAccessToFile( );
    return SUCCESS;
}
```

One of skill in the art in possession of the present disclosure will recognize that code, such as the example code provided for the smart contract above, may be included in a blockchain transaction that is directed to a blockchain address (and that may include an amount of cryptocurrency required to have the blockchain devices validate that blockchain transaction), and blockchain devices receiving that blockchain transaction will then validate that blockchain transaction and add the code to the blockchain in association with that blockchain address in order to provide the smart contract on the blockchain (i.e., in association with that blockchain address.) As such, as discussed in further detail below, subsequent blockchain transactions that are directed to that blockchain address and received by the blockchain devices will cause those blockchain devices to execute that code/smart contract. While one of skill in the art in possession of the present disclosure will appreciate that the example code provided for the smart contract above is relatively simple code that provides for a determination of the validity of a requestor account (e.g., an account of a user of a client device requesting a configuration profile), the authorization of the requestor account, and the validity of an IT asset (e.g, the client device), but smart contracts according to the teachings of the present disclosure may include code that provides for a variety of functionality that will fall within the scope of the present disclosure as well.

Figure 8:
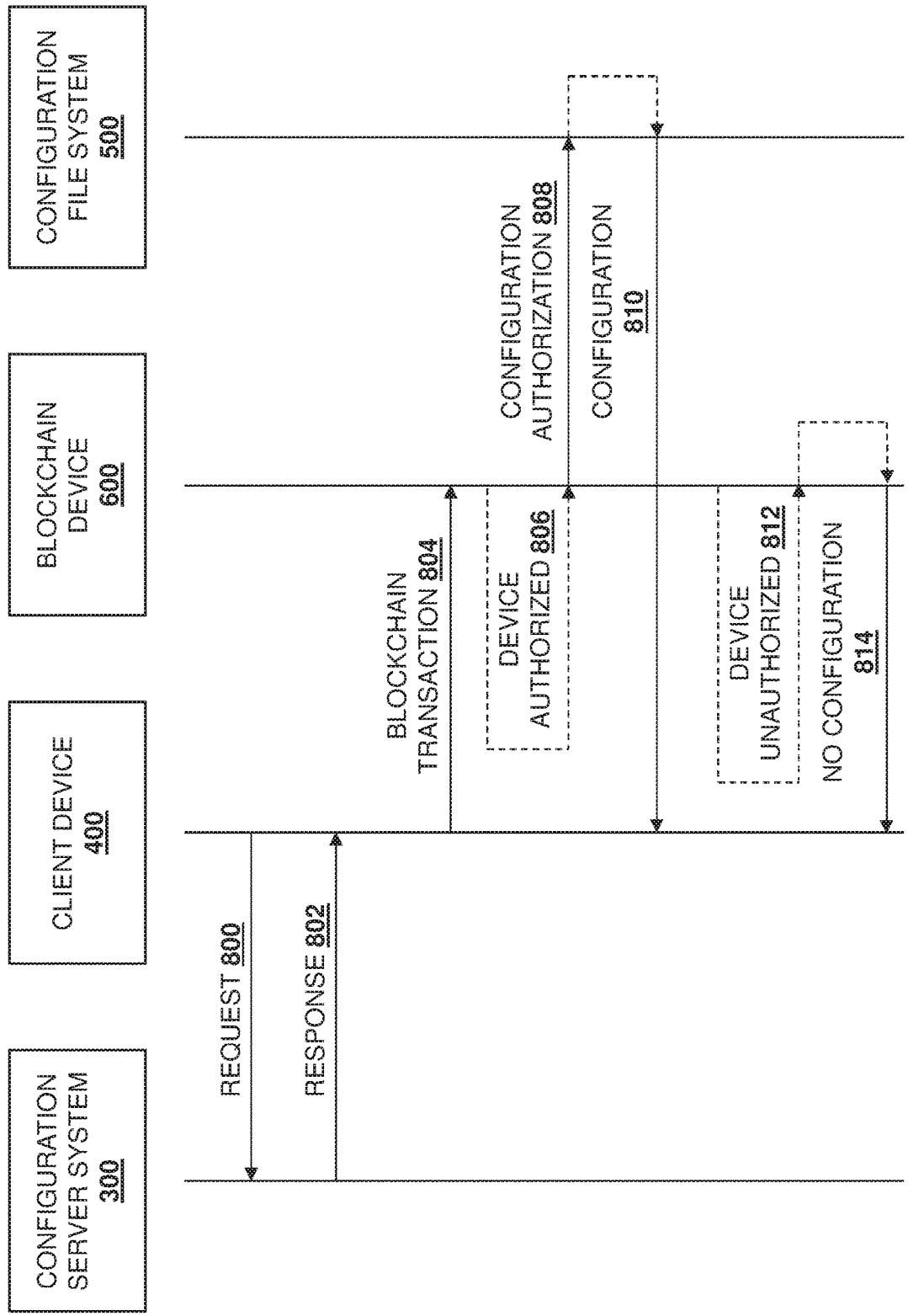
FIG. 8 is a swim-lane diagram illustrating an embodiment of the provisioning of a configuration profile using the blockchain-based configuration profile provisioning system of FIG. 2.

The method 700 begins at block 702 where a client device generates and transmits a configuration profile request to a server system. In an embodiment, at block 702, the client device 202*a*/400 may be coupled to the network 204, started up, rebooted, and/or otherwise be initialized and, in response, the client engine 404 in the client device 400 may operate to generate a configuration profile request. For example, at block 702, the client engine 404 in the client device 400 may operate to generate a DHCP discover packet that is configured to provide a request for a configuration profile. In a specific example, the DHCP discover packet generated by the client device 400 may utilize a DHCP option 60 request method to provide the configuration profile request. With reference to FIG. 8, the client device 400 may then transmit that configuration profile request 800 to the configuration server system 300 by broadcasting that DHCP discover packet (via the communication system 408 and the network 204) such that it is received by the configuration server system 206/300 (operating as a DHCP server, and via its communication system 308 from the network 204). However, while a specific configuration profile request has been described, one of skill in the art in possession of the present disclosure will recognize that a variety of different configuration profile requests will fall within the scope of the present disclosure as well.

The method 700 then proceeds to block 704 where the server system generates and transmits a configuration profile response that includes a blockchain address to the client device. In an embodiment, at block 704, the configuration engine 304 in the configuration server system 300 may, in response to receiving the configuration profile request (e.g., a DHCP discovery packet), operate to generate a configuration profile response. For example, at block 704, the configuration engine 304 in the configuration server system 300 may operate to generate a DHCP offer packet that is configured to provide access to a smart contract included on a blockchain by identifying the blockchain address with which that smart contract is associated (as discussed above) on that blockchain in the DHCP offer packet. In a specific example, the DHCP offer packet generated by the configuration server system 300 may utilize DHCP option 43 to identify the blockchain address. With reference to FIG. 8, the configuration server system 300 may then transmit that configuration profile response 802 to the client device 400 (via the communication system 308 and the network 204) such that it is received by the client device 202*a*/400 (via its communication system 408 from the network 204). However, while a specific configuration profile response has been described, one of skill in the art in possession of the present disclosure will recognize that a variety of different configuration profile responses will fall within the scope of the present disclosure as well.

The method 700 then proceeds to block 706 where the client device generates and broadcasts a blockchain transaction identifying the client device and directed to the blockchain address. In an embodiment, at block 706, the client engine 404 in the client device 400 may operate to generate a blockchain transaction that is configured to cause a configuration profile to be retrieved. In a specific example, the blockchain transaction generated by the client device 400 may include an identifier for the client device broadcasting that blockchain transaction, and may be directed to the blockchain address received from the configuration server system 300 at block 704. However, as discussed below, the blockchain transaction generated by the client device 400 may also include access credentials for an account of a user of the client device broadcasting that blockchain transaction, an identifier of the configuration file system from which the configuration profile should be retrieved, configuration profile security information (e.g., a current date, a current time, etc.), and/or any other information for enforcing the security policies described herein. With reference to FIG. 8, the client device 400 may then broadcast that blockchain transaction 804 (via the communication system 408 and the network 204) such that it is received by the blockchain devices 210a-c/600. However, while a blockchain transaction has been described, one of skill in the art in possession of the present disclosure will recognize that a variety of different blockchain transactions will fall within the scope of the present disclosure as well The method 700 then proceeds to block 708 where a blockchain device receives the blockchain transaction and accesses a smart contract associated with the blockchain address. In an embodiment, at block 708, the blockchain engine 604 in any or all of the blockchain devices 210a-c/600 may receive the blockchain transaction broadcast by the client device 202a/400 at block 706 (e.g., via its communication system 608 and the network 204) and, in response, validate that blockchain transaction and access the smart contract that was stored on the blockchain is association with the blockchain address to which that blockchain transaction is directed. For example, the validation of the blockchain transaction by the blockchain engine 604 in the blockchain devices 210a-c/600 at block 708 may include determining that the blockchain transaction satisfies consensus rules enforced by the blockchain devices 210a-c/600, determining that the blockchain transaction includes a required amount of a cryptocurrency fee, and/or performing a variety of other blockchain transaction validation operations that would be apparent to one of skill in the art in possession of the present disclosure. The validated blockchain transaction may then be included in a block that is appended to the blockchain as discussed above using, for example, proof-of-work methods, proof-of-stake methods, and/or other block-appending techniques that would be apparent to one of skill in the art in possession of the present disclosure.

The method 700 then proceeds to decision block 710 where it is determined whether the smart contract execution indicates that the client device is authorized to receive a configuration profile. In an embodiment, at decision block 710, the execution of the code that provides the smart contract by blockchain engine 604 in the blockchain devices 210a-c/600 allows the blockchain devices 210a-c to determine whether the client device is authorized to receive a configuration profile. As will be appreciated by one of skill in the art in possession of the present disclosure, the appending of the block that includes the blockchain transaction to the blockchain provides for the accessing and execution of the code that provides the smart contract associated with the blockchain address that was included in that blockchain transaction.

With reference to the example code provided for the smart contract above, the execution of that code by the blockchain engine 604 in the blockchain devices 210a-c/600 may provide for the verification of an account of a user of the client device that broadcast the blockchain transaction (e.g., by verifying that a username included in the blockchain transaction matches usernames stored in some verification database (not illustrated) coupled to the network 204), the authorization of an account of a user of the client device that broadcast the blockchain transaction (e.g., by verifying that a password included in the blockchain transaction matches a password associated with a username stored in some authorization database (not illustrated) coupled to the network 204), the verification of the client device that broadcast the blockchain transaction (e.g., by verifying that an identifier of the client device included in the blockchain transaction is associated with a configuration profile in the configuration file system 208/500), the authorization of configuration profile access according to any of a variety of access rules (e.g., by verifying that a date/time included in the blockchain transaction is associated with an authorized date/time for configuration profile access in the configuration file system 208/500), and/or the verification, authorization, and/or enforcement of any other configuration profile access rules that would be apparent to one of skill in the art in possession of the present disclosure.

If at decision block 710, it is determined that the smart contract execution indicates that the client device is authorized to receive a configuration profile, the method 700 then proceeds to block 712 where the blockchain device generates and transmits a configuration profile token to a configuration file system. With reference to FIG. 8, in an embodiment of block 712, the execution of the smart contract by the blockchain device 600 may result in a device authorized indication 806 that provides for the subsequent generation of a configuration profile token. For example, upon determining the device authorized indication 806, the blockchain device 600 may execute further code in the smart contract to generate the configuration profile token. In another example, upon determining the device authorized indication 806, the blockchain device 600 may provide the device authorized indication 806 to a token server (not illustrated) coupled to the network 204 to cause that token server to generate the configuration profile token. In yet another example, the configuration profile token may be a cryptocurrency that is allocated and/or generated via the execution of the smart contract in response to the device authorized indication 806. While a few examples have been provided, one of skill in the art in possession of the present disclosure will recognize that a variety of configuration profile tokens may be generated by a variety of different devices in the blockchain-based configuration profile provisioning system 200 while remaining within the scope of the present disclosure.

At block 712, the generation of the configuration profile token may be followed by the transmittal of the configuration profile token to the configuration file system. For example, with reference to FIG. 8, the blockchain device 600 may transmit a configuration authorization 808 that includes the configuration profile token to the configuration file system 500. In another example, the token server (discussed above) that generated the configuration profile token may transmit the configuration profile token to the configuration file system 500. In yet another example, the configuration profile token provided as a cryptocurrency may be allocated to a blockchain address that is controlled by the configuration file system 600. In yet another embodiment, the blockchain device 600 may transmit the configuration profile token to the client device 400, which may then transmit the configuration profile token to the configuration file system 500. In yet another example, the configuration profile token provided as a cryptocurrency may be allocated to a blockchain address that is controlled by the client device 400, which may then transmit that cryptocurrency to the configuration file system 500. While a few examples have been provided, one of skill in the art in possession of the present disclosure will recognize that a configuration profile tokens may be transmitted to the configuration file system by a variety of different devices in the blockchain-based configuration profile provisioning system 200 while remaining within the scope of the present disclosure.

The method 700 then proceeds to at block 714 where the configuration file system retrieves and transmits a configuration profile to the client device. In an embodiment, at block 714, the configuration file engine 504 in the configuration file system 208/500 may, in response to receiving the configuration profile token at block 712, retrieve and transmit a configuration profile to the client device. For example, the configuration profile token (and/or the configuration authorization 808) may identify the client device and/or the configuration profile, and the configuration file engine 504 in the configuration file system 208/500 may utilize that identification to retrieve the configuration profile that the client device is authorized to receive. With reference to FIG. 8, the configuration file engine 504 in the configuration file system 208/500 may then transmit the configuration profile in a configuration communication 810 to the client device 400. As would be understood by one of skill in the art in possession of the present disclosure, the client engine 404 in the client device 400 may then utilize the configuration profile received in the configuration communication 810 to configure itself to communicate with other devices over the network 204.

If at decision block 710, it is determined that the smart contract execution indicates that the client device is not authorized to receive a configuration profile, the method 700 then proceeds to block 716 where the blockchain device stores an identifier for the client device on a blockchain. In an embodiment, at block 716, the blockchain engine 604 in the blockchain device 600 may operate to store an identifier for the client device (e.g., along with the verified blockchain transaction) on the blockchain (e.g., in the block that was appended to the blockchain as discussed above). Furthermore, with reference to FIG. 8, in an embodiment of block 716, the execution of the smart contract by the blockchain device 600 that indicates that the client device is not authorized to receive the configuration profile may result in a device unauthorized indication 812 that provides for the subsequent generation of a no-configuration message 814 that is transmitted to the client device 400. For example, upon determining the device unauthorized indication 812, the blockchain device 600 may execute further code in the smart contract to generate the no-configuration message 812 and send that no-configuration message 812 to the client device 400. While a few examples have been provided, one of skill in the art in possession of the present disclosure will recognize that a variety of actions may be taken for an unauthorized client device while remaining within the scope of the present disclosure.

One of skill in the art in possession of the present disclosure will recognize that, following the method 700, the blockchain maintained by the blockchain devices 210*a-c* may be analyzed to identify any client devices that have attempted to obtain a configuration profile and failed (e.g., via the associated blockchain transactions stored on the blockchain.) Furthermore, in some embodiments, the execution of the smart contract that determines that a client device is not authorized to receive a configuration profile may cause the blockchain devices 210*a-c* to ignore subsequent blockchain transactions from those client devices (e.g., "block" those client devices from accessing configuration profiles for some amount of time.) As such, the execution state of the smart contract for any blockchain transaction will indicate either success (i.e., configuration profile provisioning to a client device) or failure (i.e., client device not authorized to receive a configuration profile), and those execution states are recorded on the blockchain (e.g., except in the case in which the client device does not provide a sufficient amount of cryptocurrency to the blockchain devices to process the transaction (when required)). That blockchain transaction record may be analyzed by a network administrator and helps to, for example, limit the number of transactions (e.g., DDOS attack prevention) and block further client requests until the intent of spurious requests can be verified.

Figure 9:
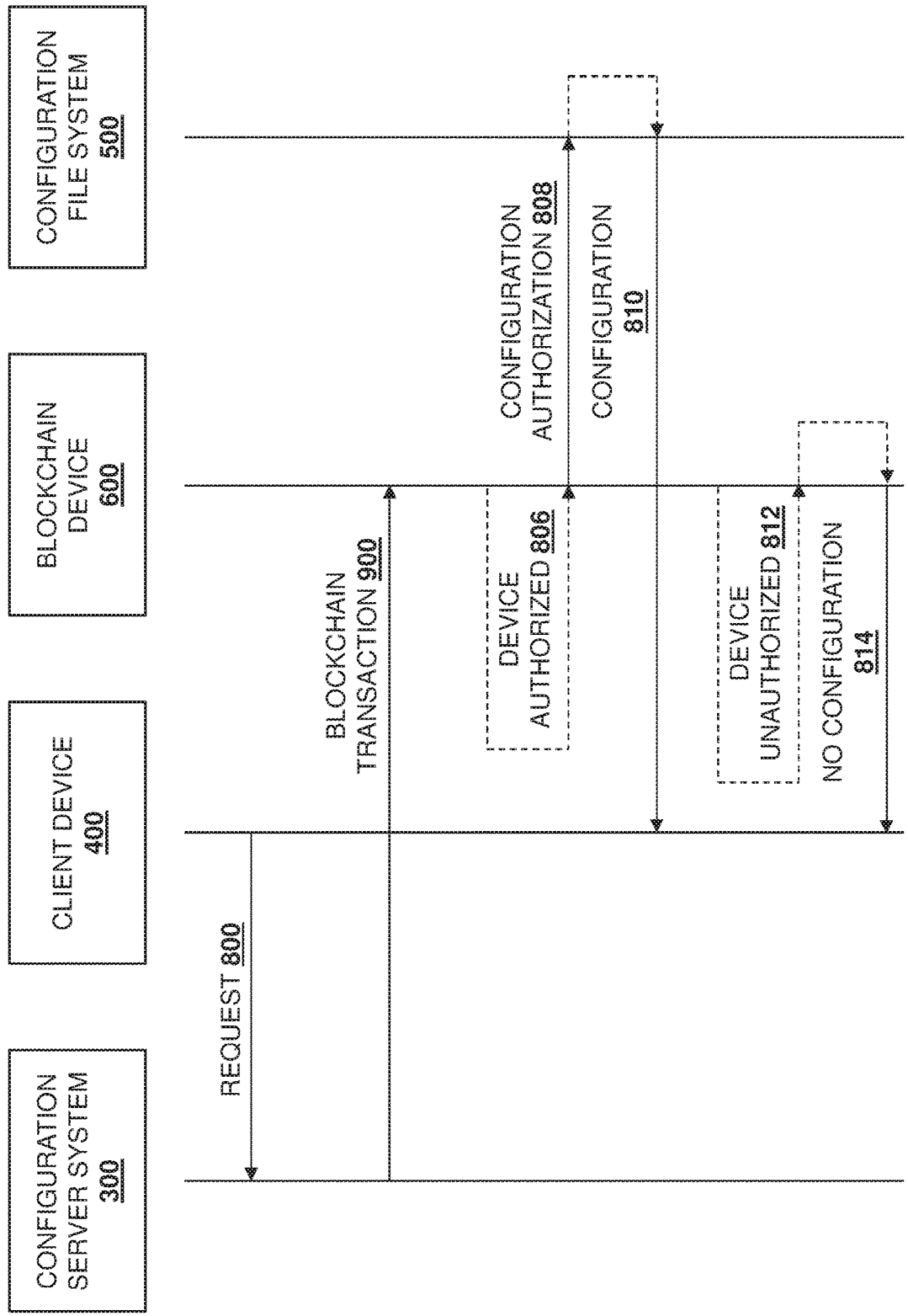
FIG. 9 is a swim-lane diagram illustrating an embodiment of the provisioning of a configuration profile using the blockchain-based configuration profile provisioning system of FIG. 2.

Referring now to FIG. 9, an alternate embodiment of the performance of the method 700 is illustrated that is substantially similar to that discussed above, with the exception that the configuration server system 300 may broadcast a blockchain transaction 900, which is substantially similar to the blockchain transaction 804 discussed above with reference to FIG. 8, in response to receiving the configuration profile request 800. As such, in some embodiments, rather than the configuration server system 300 providing the configuration profile response 802 that includes the blockchain address to the client device 400 so that the client device 400 can broadcast the blockchain transaction 804 (as illustrated in FIG. 8), the configuration server system 300 may broadcast the blockchain transaction 900 to cause the configuration profile to be provided to the client device 400.

Figure 10:
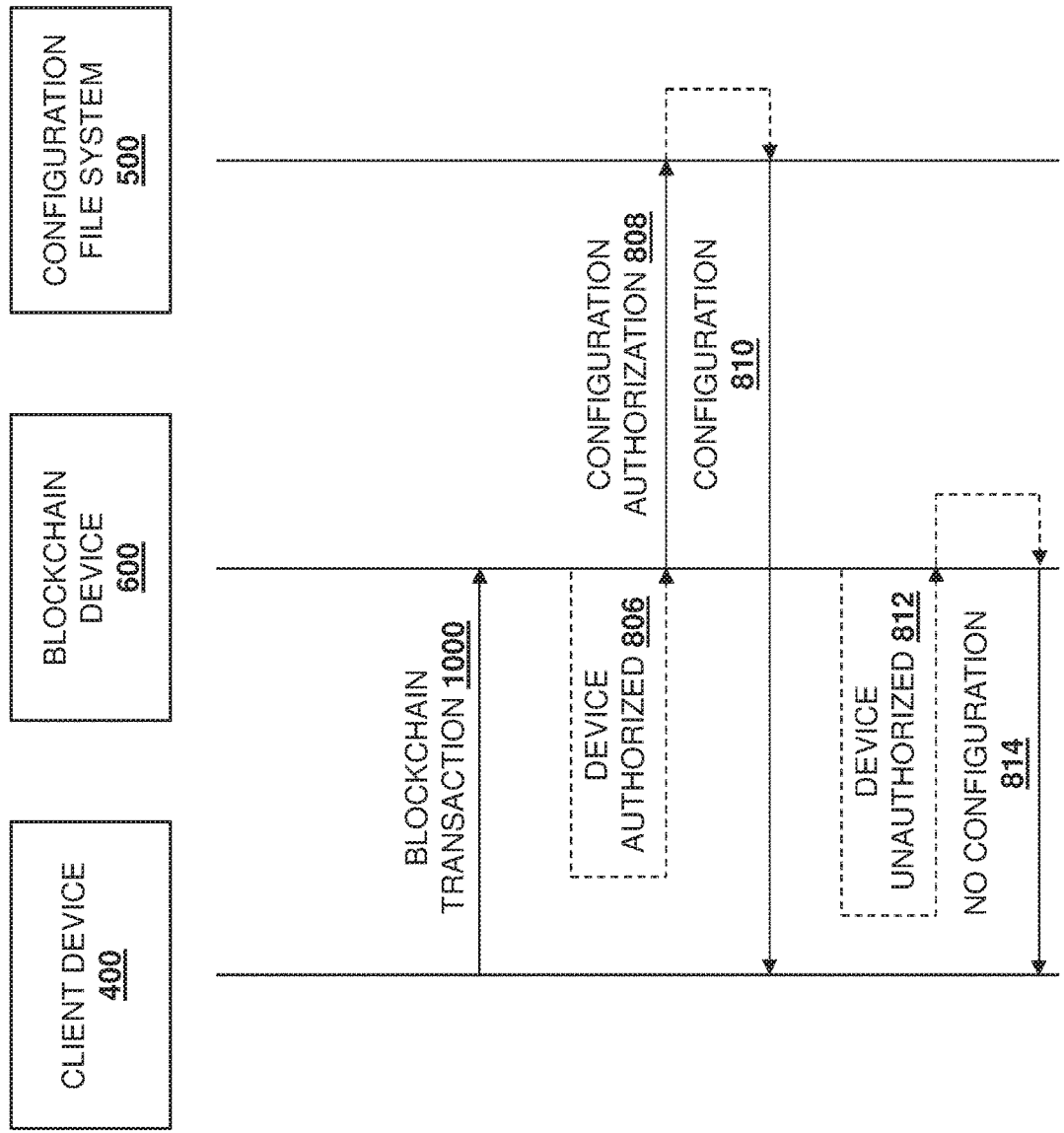
FIG. 10 is a swim-lane diagram illustrating an embodiment of the provisioning of a configuration profile using the blockchain-based configuration profile provisioning system of FIG. 2.

Referring now to FIG. 10, another alternate embodiment of the performance of the method 700 is illustrated that is substantially similar to that discussed above, with the exception that the configuration server system 300 is omitted, and the client device broadcasts a blockchain transaction 1000, which is substantially similar to the blockchain transaction 804 discussed above with reference to FIG. 8, in order to request a configuration profile. As such, in some embodiments, rather than utilizing the configuration profile request 800 and the configuration profile response 802 to provide the blockchain address to the client device 400 so that the client device 400 can broadcast the blockchain transaction 804 (as illustrated in FIG. 8), the client device may broadcast the blockchain transaction 1000 upon its initialization to cause the configuration profile to be provided to the client device 400.

Thus, systems and methods have been described that provide a decentralized access control policy framework for securely disseminating configuration profiles via blockchain-based smart contracts that define configuration profile access rights for client devices in a network, with client devices in the network sending configuration profile requests (e.g., DHCP requests) to a configuration server system, which responds with a configuration profile response (e.g., a DHCP response) that includes a blockchain address included in a blockchain and associated with the smart contract. A client device receiving a configuration profile response may then generate a blockchain transaction directed to the blockchain address and including an identifier for the client, and broadcast that blockchain transaction to a blockchain network of blockchain devices. The blockchain devices receiving that broadcast blockchain transaction will operate to validate that transaction and access a smart contract included in the blockchain, and then execute that smart contract to determine whether the client device that broadcast that blockchain transaction is authorized to receive a configuration profile. If the execution of the smart contract indicates that the client device may receive the configuration profile, the blockchain device may cause a configuration profile token to be released to a configuration file system, which will in turn provide a configuration profile to the client device that broadcast the blockchain transaction so that the client device may configure itself to communicate with other devices via a network.

As will be appreciated by one of skill in the art in possession of the present disclosure, the blockchain-based configuration profile provisioning system of the present disclosure solves many of the issues with conventional configuration profile provisioning systems discussed above. For example, the blockchain-based configuration profile provisioning system of the present disclosure enables greater flexibility to on-premises network administrator control in hybrid clouds with regard to DHCP services and offerings adherence to enterprise security policies performed quickly and at a low cost. Furthermore, client devices in the blockchain-based configuration profile provisioning system of the present disclosure may join a network with no prior knowledge about the network, and with confidence that the blockchain-enabled configuration profile provisioning is not being provided by malicious devices impersonating an authorized configuration profile server. Further still, the blockchain-based configuration profile provisioning system of the present disclosure utilizes an authentication and authorization scheme for providing vendor specific information, which prevents such vendor specific information from being exposed to unauthorized client devices and users in the network. Finally, support of vendor specific options according to different versions of the configuration profile protocol (e.g., DHCPv4 and DHCPv6) is trivial utilizing the blockchain-based configuration profile provisioning system of the present disclosure Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A blockchain-based configuration profile provisioning system, comprising:
 a first client computer; and
 a Dynamic Host Configuration Protocol (DHCP) server system that is configured to:
  receive, from the first client computer, a DHCP request and, in response, generate and transmit a DHCP response to the first client computer that includes a blockchain address in a DHCP option,
 wherein the first client computer is configured to:
  receive the DHCP response transmitted by the DHCP server;
  generate and broadcast a blockchain transaction that identifies the first client computer and is directed to the blockchain address that was included in the DHCP option and that is included in a blockchain;
 a blockchain computer that is configured to:
  receive the blockchain transaction broadcast by the first client computer;
  execute a smart contract associated with the blockchain address; and
  determine that the execution of the smart contract has provided an indication that the first client computer identified in the blockchain transaction is authorized to receive a configuration profile and, in response, cause a configuration profile token to be generated and transmitted; and
 a configuration file system that is configured to:
  receive the configuration profile token that was generated and transmitted in response to the execution of the smart contract indicating that the first client computer is authorized to receive the configuration profile and, in response, retrieve and transmit the configuration profile to the first client computer, wherein the configuration profile includes an Internet Protocol (IP) address that allows the first client computer to configure itself using the IP address to communicate with one or more devices over a network without prior knowledge about the network.

2. The system of claim 1, wherein the blockchain transaction identifies the configuration file system, and wherein the blockchain computer is configured to:
 transmit the configuration profile token to the configuration file system identified in the blockchain transaction.

3. The system of claim 1, wherein the blockchain computer is configured to:
 determine that the execution of the smart contract has provided an indication that the first client computer identified in the blockchain transaction is not authorized to receive a configuration profile and, in response, store the identifier for the first client computer in the blockchain.

4. The system of claim 1, wherein the blockchain computer is configured to transmit the configuration profile token to the first client computer, and the first client computer is configured to transmit the configuration profile token to the configuration file system to cause the configuration file system to retrieve and transmit the configuration profile to the first client computer.

5. An Information Handling System (IHS) network, comprising:
 a blockchain device that is coupled to a first network and that includes:
  a blockchain device processing system; and
  a blockchain device memory system that is coupled to the blockchain device processing system and that includes instructions that, when executed by the blockchain device processing system, cause the blockchain device to:
   receive a blockchain transaction that identifies a first client device that is coupled to the first network and that is directed to a blockchain address that is included in a blockchain and that was included in a Dynamic Host Configuration Protocol (DHCP) option of a DHCP response, wherein the first client device broadcast the blockchain transaction in response receiving the DHCP response that includes the blockchain address in the DHCP option;
   execute a smart contract that is associated with the blockchain address that is included in a blockchain and that is identified in the blockchain transaction; and
   determine that the execution of the smart contract has provided an indication that the first client device identified in the blockchain transaction is authorized to receive a configuration profile and, in response, cause the generation and transmittal of a configuration profile token that is configured to cause a configuration file system that receives the configuration profile token to provide a configuration profile to the first client device, wherein the configuration profile includes an Internet Protocol (IP) address that allows the first client device to configure itself using the IP address to communicate with one or more devices over the first network without prior knowledge about the first network, and wherein the configuration profile token is generated and transmitted in response to the execution of the smart contract indicating that the first client device is authorized to receive the configuration profile.

6. The IHS network of claim 5, further comprising:
a DHCP server device that is coupled to the first network and that includes:
  a server device processing system; and
  a server device memory system that is coupled to the server device processing system and that includes instructions that, when executed by the server device processing system, cause the server device to:
    receive a DHCP request from the first client device and, in response, generate and transmit the DHCP response.

7. The IHS network of claim 5, wherein a configuration profile device is identified in the blockchain transaction, and wherein the blockchain device memory system includes instructions that, when executed by the blockchain device processing system, cause the blockchain device to:
  transmit the configuration profile token to the configuration file system that is identified in the blockchain transaction and that is coupled to the first network.

8. The IHS network of claim 5, wherein the blockchain device memory system includes instructions that, when executed by the blockchain device processing system, cause the blockchain device to:
  determine that the execution of the smart contract has provided an indication that the first client device identified in the blockchain transaction is not authorized to receive a configuration profile and, in response, store the identifier for the first client device in the blockchain.

9. The IHS network of claim 5, wherein the blockchain device memory system includes instructions that, when executed by the blockchain device processing system, cause the blockchain device to:
  transmit the configuration profile token to the first client device to enable the first client device to transmit the configuration profile token to a configuration file system that is coupled to the first network and that retrieves and transmits, in response to receiving the configuration profile token, the configuration profile to the first client device.

10. The IHS network of claim 5, further comprising:
a configuration profile device that is coupled to the first network and that includes:
  a configuration profile device processing system; and
  a configuration profile device memory system that is coupled to the configuration profile device processing system and that includes instructions that, when executed by the configuration profile device processing system, cause the configuration profile device to:
    receive the configuration profile token and, in response, retrieve and transmit the configuration profile to the first client device.

11. A method for providing configuration profiles via a blockchain, comprising:
  receiving, by a first client device from a Dynamic Host Configuration Protocol (DHCP) server, a DHCP response that includes a blockchain address in a DHCP option;
  generating and broadcasting, by the first client device, a blockchain transaction that identifies the first client device and is directed to the blockchain address that is included in the DHCP option and that is included in the blockchain;
  receiving, by a blockchain device, the blockchain transaction broadcast by the first client device;
  executing, by the blockchain device, a smart contract associated with the blockchain address;
  determining, by the blockchain device, that the execution of the smart contract has provided an indication that the first client device identified in the blockchain transaction is authorized to receive a configuration profile and, in response, causing a configuration profile token to be generated and transmitted; and
  receiving, by a configuration filesystem, the configuration profile token that was generated and transmitted in response to the execution of the smart contract indicating that the first client computer is authorized to receive the configuration profile and, in response, retrieving and transmitting the configuration profile to the first client device, wherein the configuration profile includes an Internet Protocol (IP) address that allows the first client device to configure itself using the IP address to communicate with one or more devices over a network without prior knowledge about the network.

12. The method of claim 11, further comprising:
  generating and transmitting, by the first client device, a DHCP request; and
  receiving, by a server system, the DHCP request and, in response, generating and transmitting the DHCP response to the first client device that includes the blockchain address.

13. The method of claim 11, wherein the blockchain transaction identifies the configuration filesystem, and wherein the method further comprises:
  transmitting, by the blockchain device, the configuration profile token to the configuration file system identified in the blockchain transaction.

14. The method of claim 11, further comprising:
  determining, by the blockchain device, that the execution of the smart contract has provided an indication that the first client device identified in the blockchain transaction is not authorized to receive a configuration profile and, in response, storing the identifier for the first client device in the blockchain.

15. The method of claim 14, further comprising:
  ignoring, by the blockchain device, a subsequent blockchain transaction generated and broadcast by the first client device.

16. The method of claim 11, further comprising:
  transmitting, by the blockchain device, the configuration profile token to the first client device;
  transmitting, by the first client device, the configuration profile token to the configuration file system; and retrieving and transmitting, by the configuration file system, the configuration profile to the first client device.

\* \* \* \* \*